US011558664B1

(12) United States Patent
Desai et al.

(10) Patent No.: US 11,558,664 B1
(45) Date of Patent: Jan. 17, 2023

(54) ELECTRONIC DEVICE THAT PAUSES MEDIA PLAYBACK BASED ON INTERRUPTION CONTEXT

(71) Applicant: MOTOROLA MOBILITY LLC, Wilmington, DE (US)

(72) Inventors: Rahul B. Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/410,199

(22) Filed: Aug. 24, 2021

(51) Int. Cl.
*H04N 21/442* (2011.01)
*G10L 25/51* (2013.01)
(Continued)

(52) U.S. Cl.
CPC ....... *H04N 21/44218* (2013.01); *G06V 20/52* (2022.01); *G06V 40/10* (2022.01); *G10L 25/51* (2013.01); *H04N 21/422* (2013.01); *H04N 21/436* (2013.01); *H04N 21/4394* (2013.01); *H04N 21/44* (2013.01); *H04R 1/326* (2013.01)

(58) Field of Classification Search
CPC ............. H04N 21/44218; H04N 5/247; H04N 21/4223; H04N 21/43615; H04N 21/4532; H04N 21/422; H04N 21/436; H04N 21/4394; H04N 21/44; G06V 40/172; G06V 40/50; G06V 20/52; G06V 40/10; G10L 25/51; H04R 1/326
See application file for complete search history.

(56) References Cited

U.S. PATENT DOCUMENTS 6,968,565 B1 * 11/2005 Slaney ................ H04N 21/812
348/E7.061
8,645,985 B2 * 2/2014 Deshpande ...... H04N 21/42203
706/14
(Continued)

FOREIGN PATENT DOCUMENTS

TR          201610746 A  *  2/2017    ............... G06N 3/08
WO    WO-0237474 A1 *  5/2002    ............. G06N 3/004
(Continued)

OTHER PUBLICATIONS

TR-201610746-A English translation (Year: 2017).*

*Primary Examiner* — Fernando Alcon
(74) *Attorney, Agent, or Firm* — Isidore PLLC

(57) ABSTRACT

An electronic device, computer program product, and method manage presenting and pausing of media content in response to locally detected visual and aural interruptions. The electronic device is configured to determine, using one or more sensors from among: (i) an image capturing device positioned to have a field of view of a monitored area and (ii) a microphone positioned to detect sounds in or near the monitored area. A consumer is in the monitored area during presenting of media content by a media output device. The electronic device is configured to monitor the one or more sensors to determine whether an interruption is occurring that can degrade consumer experience relative to the presenting of the media content. In response to determining that the interruption is occurring, the electronic device is configured to pause the presenting of the media content on the media output device.

20 Claims, 8 Drawing Sheets

(51) Int. Cl.
*H04N 21/44* (2011.01)
*H04N 21/436* (2011.01)
*H04N 21/422* (2011.01)
*H04N 21/439* (2011.01)
*H04R 1/32* (2006.01)
*G06V 20/52* (2022.01)
*G06V 40/10* (2022.01)

(56) References Cited

U.S. PATENT DOCUMENTS

| | | | | |
|---|---|---|---|---|
| 8,914,818 | B2* | 12/2014 | Weast | H04N 21/42201 |
| | | | | 725/12 |
| 10,194,204 | B1* | 1/2019 | Don | G06Q 10/02 |
| 10,708,653 | B1* | 7/2020 | Stinson | H04N 21/4415 |
| 2003/0097659 | A1* | 5/2003 | Goldman | H04N 21/443 |
| | | | | 725/89 |
| 2003/0147624 | A1* | 8/2003 | Trajkovic | H04N 21/4223 |
| | | | | 386/326 |
| 2007/0061851 | A1* | 3/2007 | Deshpande | G06V 40/167 |
| | | | | 725/102 |
| 2007/0192486 | A1* | 8/2007 | Wilson | H04N 7/163 |
| | | | | 348/E7.071 |
| 2007/0260517 | A1* | 11/2007 | Zalewski | G06Q 30/0252 |
| | | | | 705/14.5 |
| 2011/0069940 | A1* | 3/2011 | Shimy | G11B 27/105 |
| | | | | 386/296 |
| 2011/0162018 | A1* | 6/2011 | Dodd | H04N 21/43622 |
| | | | | 725/78 |
| 2014/0150002 | A1* | 5/2014 | Hough | H04N 21/4532 |
| | | | | 725/9 |
| 2016/0057497 | A1* | 2/2016 | Kim | H04N 21/4223 |
| | | | | 725/10 |
| 2016/0198229 | A1* | 7/2016 | Keipert | H04N 21/47217 |
| | | | | 725/12 |
| 2016/0248766 | A1* | 8/2016 | Tembey | H04L 63/102 |
| 2016/0261915 | A1* | 9/2016 | Niebres | H04N 21/4318 |
| 2017/0332140 | A1* | 11/2017 | Blake | H04N 21/23113 |
| 2020/0201495 | A1* | 6/2020 | Coffman | H04N 21/43615 |
| 2020/0221176 | A1* | 7/2020 | Hwang | H04N 21/44224 |
| 2020/0236152 | A1* | 7/2020 | Bradley | H04L 65/602 |
| 2020/0275151 | A1* | 8/2020 | Xiong | H04N 21/44218 |
| 2020/0296468 | A1* | 9/2020 | Wittke | H04N 21/4751 |
| 2020/0296469 | A1* | 9/2020 | Wittke | H04N 21/44008 |
| 2021/0120204 | A1* | 4/2021 | Senapati | H04N 21/44218 |
| 2021/0120300 | A1* | 4/2021 | Arling | H04N 21/44227 |
| 2021/0136447 | A1* | 5/2021 | Daw | H04N 21/43078 |
| 2021/0158836 | A1* | 5/2021 | Iwase | G10L 25/84 |
| 2022/0015062 | A1* | 1/2022 | Carey | H04N 21/4882 |

FOREIGN PATENT DOCUMENTS

| | | | | |
|---|---|---|---|---|
| WO | WO-2019195112 A1 * | 10/2019 | | G06N 3/08 |
| WO | WO-2020219763 A1 * | 10/2020 | | H04M 19/044 |

\* cited by examiner

ELECTRONIC DEVICE THAT PAUSES MEDIA PLAYBACK BASED ON INTERRUPTION CONTEXT

BACKGROUND

1. Technical Field

The present disclosure relates generally to electronic devices having in-built audio and image sensors and which supports media playback on a separate media output device.

2. Description of the Related Art

User communication devices such as mobile phones, desktop workstations, laptops, and tablets are often equipped with a camera and a microphone to enable human interaction. Microphones and cameras can also be incorporated as peripheral devices. Initially intended to support voice and later video communication sessions, these sensors have been used for an increasing number of purposes. The user communication devices are connectable to a number of external devices that provide and/or can play audio and video media content. Given the ubiquity of user communication devices, such as smart phones, recent innovations can utilize the user interface and connectivity of the user communication device to control playing of media content at external media output devices, such as display monitors and speakers.

Although these capabilities are a significant improvement over traditional entertainment and informational media systems of past decades, certain unavoidable inconveniences continue to exist for a user who is consuming the media content. Activities, incidents and/or alarms that require the user shift attention from the media content occasionally occurs within or in proximity of the area in which the content is being consumed. For example, another person may enter the room in which the user is viewing the content and require attention from the user. Providing the attention to the person causes the user to miss portions of the media content unless the user is astute enough to remember to manually pause the playing of the media content. As another example, a person may enter the room, blocking the view of a visual portion of the media content or speaking over or otherwise obscuring the audio portion of the media content. The user experience can be degraded by requiring the user to have to manually pause playing of the media content in response to the interruption. Additionally and/or alternatively, the user may find it difficult to later find the right location of the media content before the interruption for restarting playing of the media content.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
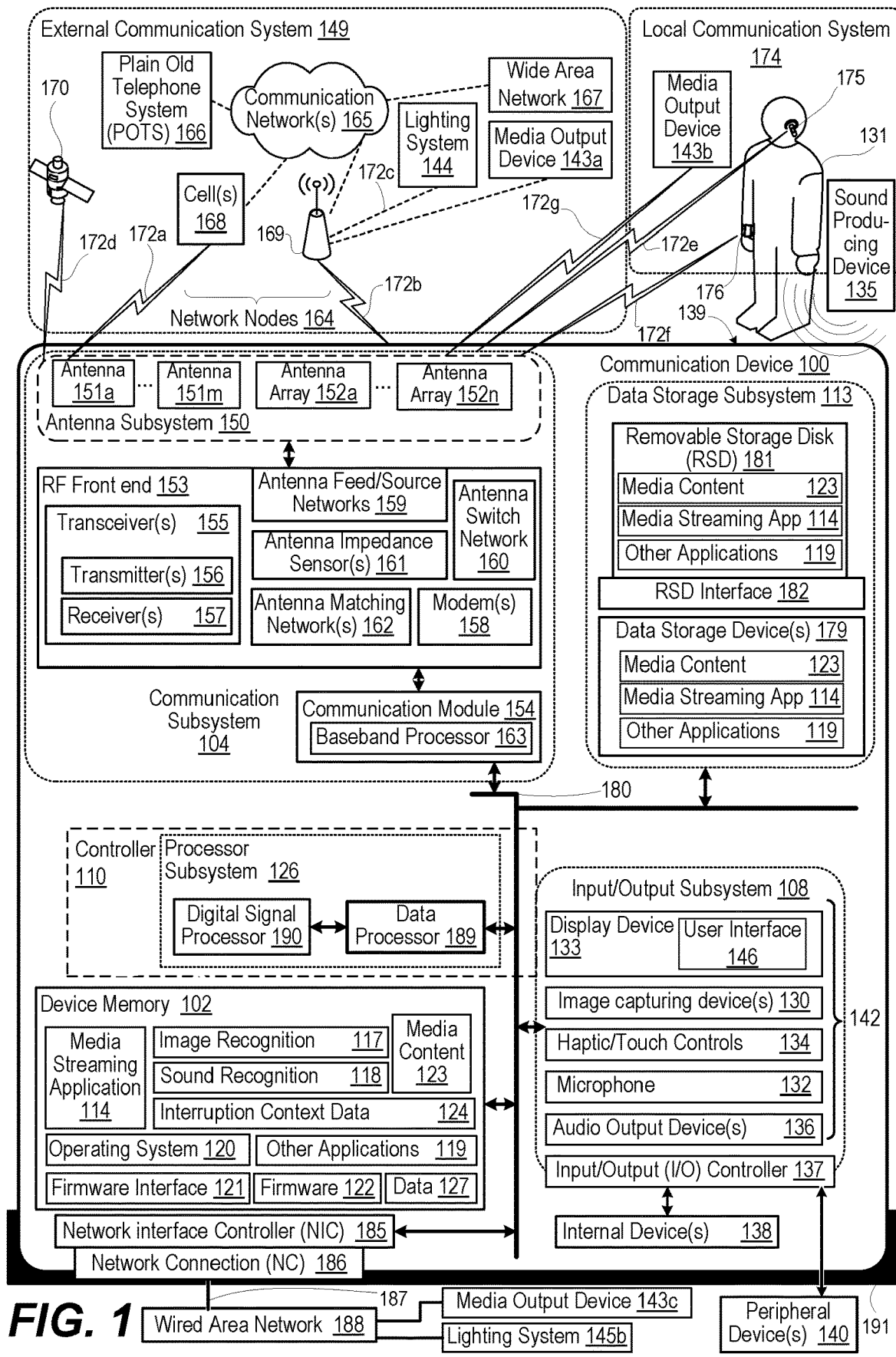
FIG. 1 depicts a functional block diagram of a communication environment of a communication device that manages presenting and pausing of media content in response to locally detected visual and aural interruptions, and within which the features of the present disclosure are advantageously implemented, according to one or more embodiments.

According to aspects of the present disclosure, an electronic device, a computer program product, and a method manage presenting and pausing of media content in response to locally detected visual and aural interruptions. The electronic device includes a device interface, which is communicatively coupled to a media output device that presents media content in a monitored area. The electronic device includes one or more sensors from among: (i) an image capturing device positionable to have a field of view of the monitored area and (ii) a microphone positionable to detect sounds in or near the monitored area. While the electronic device is positioned in or proximate to the monitored area, the one or more sensors detect one or more of an object or a sound that interrupts a person in the monitored area from experiencing the presenting of the media content. A controller of the electronic device is communicatively coupled to the device interface and the one or more sensors. The controller determines, using inputs from the one or more sensors, that a consumer is in the monitored area during the presenting of the media content. The controller monitors the one or more sensors to determine whether an interruption that can degrade consumer experience relative to the presenting of the media content has occurred or is occurring. In response to determining that the interruption has occurred or is occurring, the controller pauses the presenting of the media content on the media output device. The pausing of the presenting of the media content is autonomous, without any input from the consumer.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts an operating environment having a functional block diagram of an electronic device, specifically communication device 100, within which several of the features of the present disclosure are advantageously implemented. Referring to the specific component makeup and the associated functionality of communication device 100 of FIG. 1. In one or more embodiments, communication device 100 has device memory 102, communication subsystem 104, data storage subsystem 106, and input/output (I/O) subsystem 108. Device memory 102 and each subsystem (104, 106, and 108) are managed by controller 110. Device memory 102 includes program code for applications, such as media streaming application 114, image recognition utility 117, sound recognition utility 118, and other application(s) 119. Device memory 102 further includes operating system (OS) 120, firmware interface 121, such as basic input/output system (BIOS) or Uniform Extensible Firmware Interface (UEFI), and firmware 122. Device memory 102 can include media content 123 and interruption context data 124 used by media streaming application 114.

Controller 110 includes processor subsystem 126 that executes program code to provide operating functionality of communication device 100. The software and/or firmware modules have varying functionality when their corresponding program code is executed by processor subsystem 126 or secondary processing devices within communication device 100. Processor subsystem 126 of controller 110 can execute program code of media streaming application 114 and other applications 119 to configure communication device 100 to perform specific functions.

I/O subsystem 108 includes user interface components such as image capturing device 130, microphone 132, display device 133, touch/haptic controls 134, and audio output device(s) 136. I/O subsystem 108 also includes I/O controller 137. I/O controller 137 connects to internal devices 138, which are internal to housing 139, and to peripheral devices 140, such as external speakers, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 140 and other components of communication device 100 that use a different configuration for inputs and outputs.

Communication device 100 is managed by controller 110, which is communicatively coupled to at least one image capturing device 130 and to at least one user interface device 142 that includes at least one microphone 132. Image capturing device 130 can detect whether consumer 131 is positioned with a monitored area to consume a visual portion of media content 123. Image capturing device 130 can detect whether consumer 131 is positioned proximate to one or more media output device(s) 143a-143c, blocking the visual portion of media content 123 from another consumer 131. Microphone 132 can detect a voice of consumer 131 and an aural alarm from sound producing device 135, such as a household appliance. Microphone 132 can detect other contextual sounds associated with an interruption. Controller 110 manages presenting and pausing of media content 123 at media output device(s) 143a-143c. In particular, controller 110 pauses media output device 143 in response to locally detected visual and/or aural interruptions locally detected by at least one image capturing device 130 and at least one microphone 132. In one or more embodiments, communication device 100 is communicatively coupled to media output device(s) 143a-143c using device interface 211 that can support one or more of: (i) wireless protocols 212; (ii) wired protocols 213; and (iii) radio access protocols 214 (FIG. 2) described below. In an example, device interface 211 (FIG. 2) is provided by a communication subsystem 104 that supports at least one wireless or radio access protocol. In another example, device interface 211 (FIG. 2) is a wired connection to media output device(s) 143a-143c. Controller 110 can also be communicatively coupled to lighting system 144 to adjust lighting in support of presenting media content 123 at media output device(s) 143a-143c. In one or more embodiments, controller 110 executes program code such as media streaming application 114 stored in a computer readable storage device such as device memory 102 to control presenting and pausing of media content 123 at media output device(s) 143a-143c. Controller 110 determines, using one or more sensors, such as at least one image capturing device 130 and at least one microphone 132, that a consumer 131 is in a monitored area during the presenting of the media content 123. Controller 110 further monitors the one or more sensors to determine whether an interruption has occurred and/or is occurring that can degrade consumer experience relative to the presenting of media content 123. In response to determining that the interruption has occurred and/or is occurring, controller 110 pauses the presenting of media content 123 at media output device(s) 143a-143c.

Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring now to the communication components and features of communication device 100. Communication subsystem 104 of communication device 100 enables wireless communication with external communication system 149. Communication subsystem 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received by antenna subsystem 150 from external communication system 149. The received signal is amplified and filtered by receiver(s) 157, which demodulate received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceivers 155. Antenna matching network(s) 162 can also be used to detune the impedance of lower band antennas 151a-151m to not match the impedance of transceivers 155 to electromagnetically isolate a particular antenna.

In one or more embodiments, controller 110, via communication subsystem 104, performs multiple types of over-the-air (OTA) communication with network nodes 164 of external communication system 149. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 151a-151m are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node 169. In one or more particular embodiments, access node 169 supports communication using one or more IEEE 802.11 wireless local area network (WLAN) protocols. Wi-Fi is a family of wireless network protocols, based on the IEEE 802.11 family of standards, which are commonly used between user devices and network devices that provide Internet access. In one or more particular embodiments, communication subsystem 104 communicates with one or more locally networked devices via wired or wireless link 172c provided by access node 169. Examples of locally networked devices include lighting system 144 and media output device 143a, and external devices 178a to communicate urgent notifications to communication device 100. Communication subsystem 104 receives downlink broadcast channel(s) 172d from GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with headset 175. Communication subsystem 104 communicates via second low power wireless communication channel(s) 172g, such as Bluetooth, with media output device 143b. Communication subsystem 104 communicates via second low power wireless communication channel(s) 172f, such as Bluetooth, with smart watch 176.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as media streaming application 114 and other application(s) 119 that use communication services. These applications can be loaded into device memory 102 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for media streaming application 114 and other applications 119. When executed by controller 110, the program code causes or configures communication device 100 to improve a user experience in participating in a video communication session described herein.

In one or more embodiments, I/O subsystem 108 includes network interface controller (NIC) 185 with a network connection (NC) 186 on housing 139. Network cable 187 connects NC 186 to wired area network 188. Wired area network 188 can be a local area network (LAN), a campus area network (CAN), a metropolitan area network (MAN), or a wide area network (WAN). For example, NC 186 can be an Ethernet connection. Media output device 143c and lighting system 145b are presented communicatively coupled to wired area network 188. In an example, communication device 100 is positioned in dock 191. Dock 191 can provide, to housing 139 of communication device 100, a charging power source and a communication connection to media output device 143.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 126, which includes one or more central processing units (CPUs), depicted as data processor 189. Processor subsystem 126 can include one or more digital signal processors 190 that are integrated with data processor 189 or are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 102. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 180) are illustrated in FIG. 1, it is to be understood that more, fewer, or different interconnections may be present in other embodiments.

Figure 2:
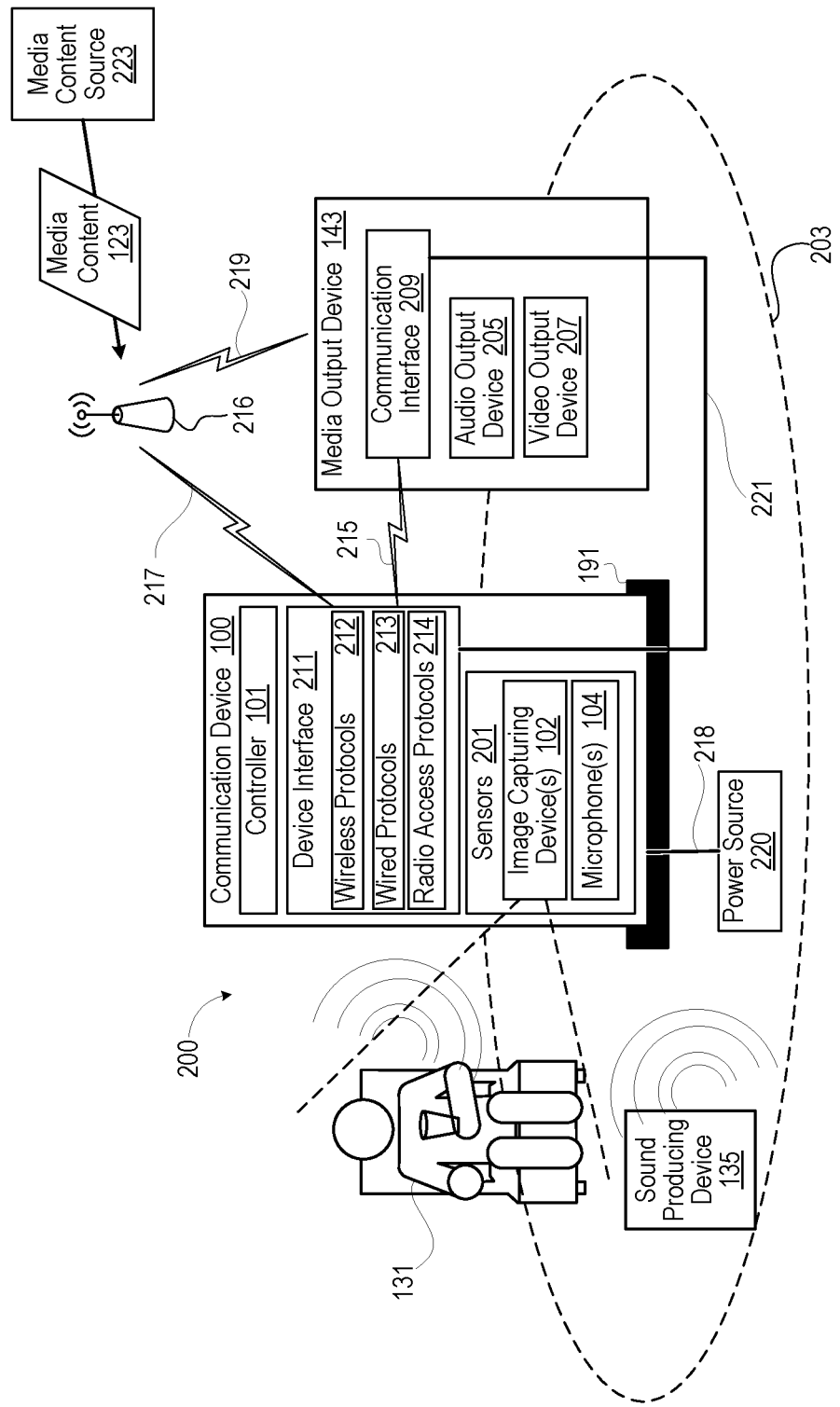
FIG. 2 depicts a communication system that includes the communication device of FIG. 1 visually and aurally monitoring a consumer and an alarm-producing device for interruption context and wirelessly controlling a media output device, according to one or more embodiments.

FIG. 2 depicts communication system 200 with communication device 100 having sensors 201 that monitor, for interruption context, monitored space 203, which includes consumer 131 and sound producing device 135. In an example, sensors 201 include with image capturing device(s) 102 and microphone(s) 104 that respectively detect visual and aural interruptions proximate to monitored space 203 in which consumer 131 experiences presentation of media content 123 at media output device(s) 143a-143c. Sensors 201 can be integral or attached to communication device 100. Alternatively or additionally, one or more of sensors 201 can be separate and detached from communication device 100. Sensors 201 can provide interruption context data 124 (FIG. 1) to controller 110 of communication device 100, As an example, sensors 201 can detect presence and activities of persons and devices in or near monitored space 203. As another example, sensors 201 can characterize what type of interruption is occurring. Controller 110 can access interruption context data 124 (FIG. 1) that indicates how urgent and how important an interruption may be based on past responses or predefined responses. In an example, media content 123 includes an audio portion that is presented by audio output device 205. In another example, media content 123 includes a visual portion (e.g., video, images) that is presented by video output device 207. Media content 123 can be read from storage media (e.g., optical disc, RSD, etc.) by media output device 143 or received at communication interface 209 of media output device 143.

Controller 110 of communication device 100 is communicatively coupled by device interface 211 to communication interface 209 of media output device 143. In an example, device interface 211 supports a direct wireless communication channel 215. In another example, device interface 211 wirelessly connects to access point 216 via wireless communication channel 217. Access point 216 is also wirelessly connected to communication interface 209 of media output device 143 via wireless communication channel 219. In an additional example, dock 191 provides power connection 218 for connecting communication device 100 to power source 220. Dock 191 provides wired communication connection 221 for communicatively connecting device interface 211 of communication device 100 to communication interface 209 of media output device 143. Access point 216 can provide media content 123 received from network media source 223. Media content 123 can also be stored at communication device 100 or at storage associated with media output device 143.

Figure 3:
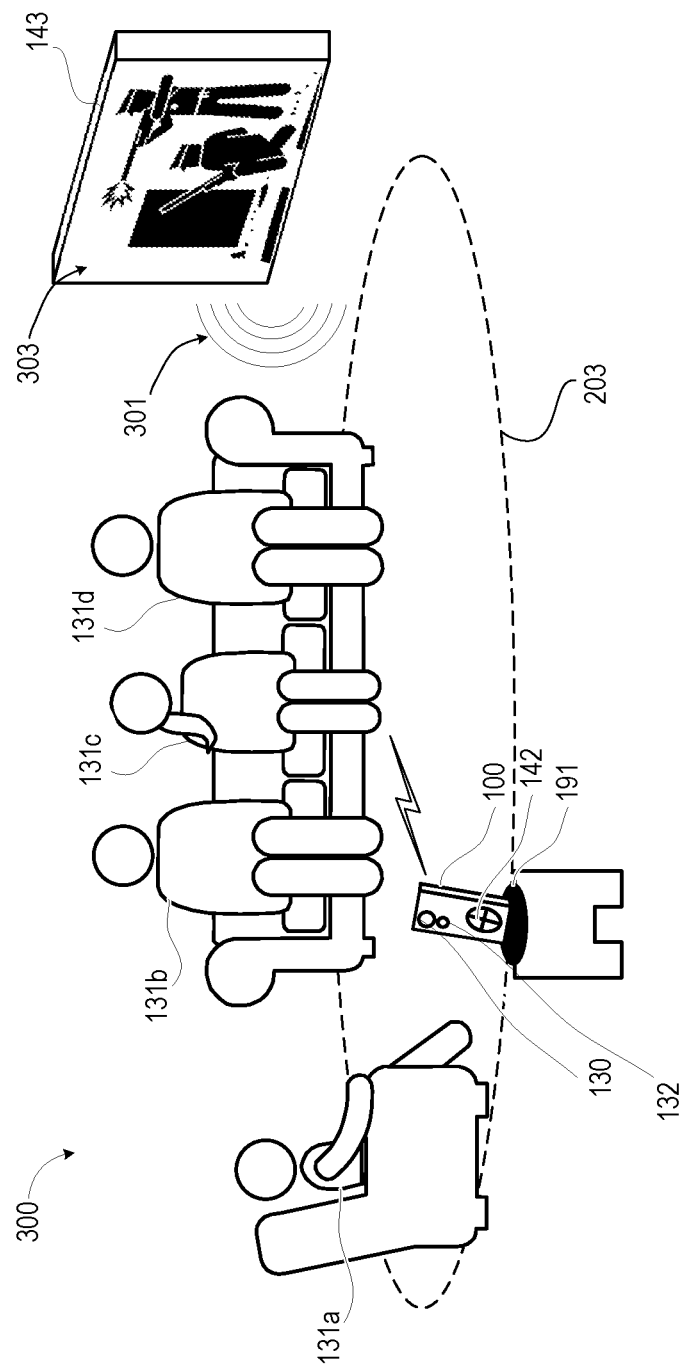
FIG. 3 depicts a viewing environment that includes the communication device of FIG. 2 during presenting of the media content, according to one or more embodiments.

FIG. 3 depicts a viewing environment 300 in which audio output 301 and visual display 303 of media content 123 (FIG. 2) are begin presented via media output device 143. Consumers 131a-131d are present in monitored area 203 and are experiencing/consuming audio output 301 and visual display 303. Dock 191 is strategically placed to (i) position communication device 100 such that at least one image capturing device 130 has a field of view of monitored area 203 and to (ii) position at least one microphone 132 to detect sounds in or near monitored area 203. Sound producing device 135 is present within or is audible within monitored area 203. Sound producing device 135 can produce a sound that creates an interruption. In an example, sound producing device 135 is a door chime. In another example, sound producing device 135 is a smoke/toxic gas sensor. In an additional example, sound producing device 135 is a household appliance. In a further example, sound producing device 135 is an intercom speaker. Dock 191 can also be proximate to one consumer 131a to facilitate access to user interface device 142 to manually select media content 123 (FIG. 2). In one or more embodiments, communication device 100 can stream media content 123 (FIG. 2) to media output device 143.

Figure 4:
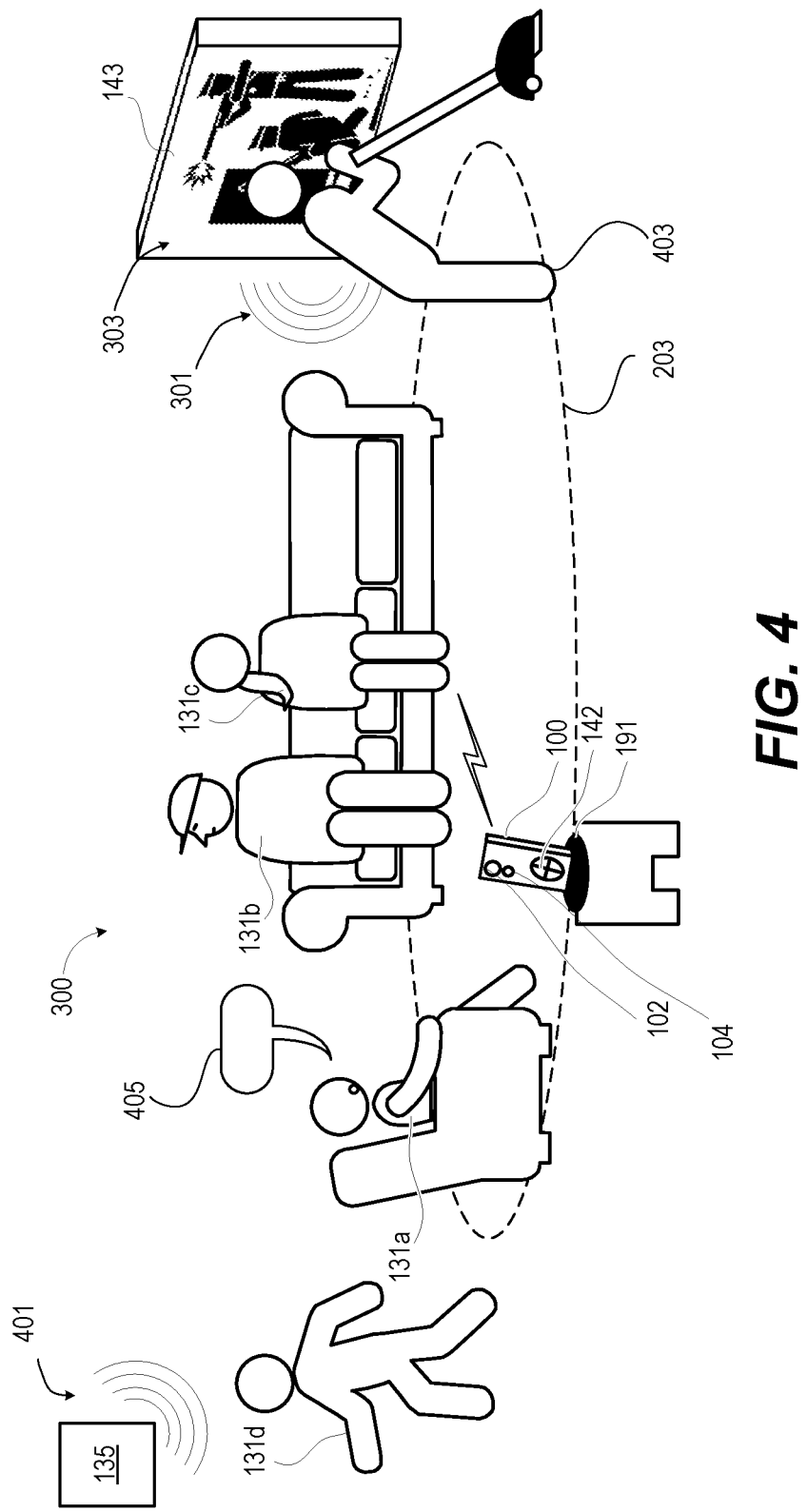
FIG. 4 depicts the viewing environment of FIG. 3 with examples of visual and aural interruptions that trigger pausing of presentation of the media content by the communication device, according to one or more embodiments.

FIG. 4 depicts a viewing environment 300 with examples of different visual and aural events that are classified as interruptions that trigger autonomous pausing by communication device 100 of presentation of media content 123 on media output device 143 (FIG. 2). As one example of an interruption, sound producing device 135 is emitting alarm sound 401 audible to consumers within viewing environment. As another example of an interruption, person 403 has entered the viewing environment and is blocking video display 303 of media content 123 (FIG. 2) at media output device 143. Person 403 is also pushing a vacuum that output sounds that is an interruption, even when person 403 is not physically blocking video display 303. As an additional example of an interruption, consumer 131a is speaking, generating spoken sound 405 that is a distraction to other consumers. As yet another example of an interruption, image capture device of communication device 100 detects that consumer 131d is leaving monitored area 203. In yet another example of an interruption, image capture device of communication device 100 detects that consumer 131b is no longer facing media output device 143 and is instead facing either consumer 131a or consumer 131d (which can be a preprogrammed trigger to indicate a conversation occurring that is distracting to at least two consumers) or facing the entry to the room or another location from which another distraction may be occurring. In response to any of these detected interruptions, communication device 100 pauses presentation of media content 123 (FIG. 2) at media output device 143.

Figure 5:
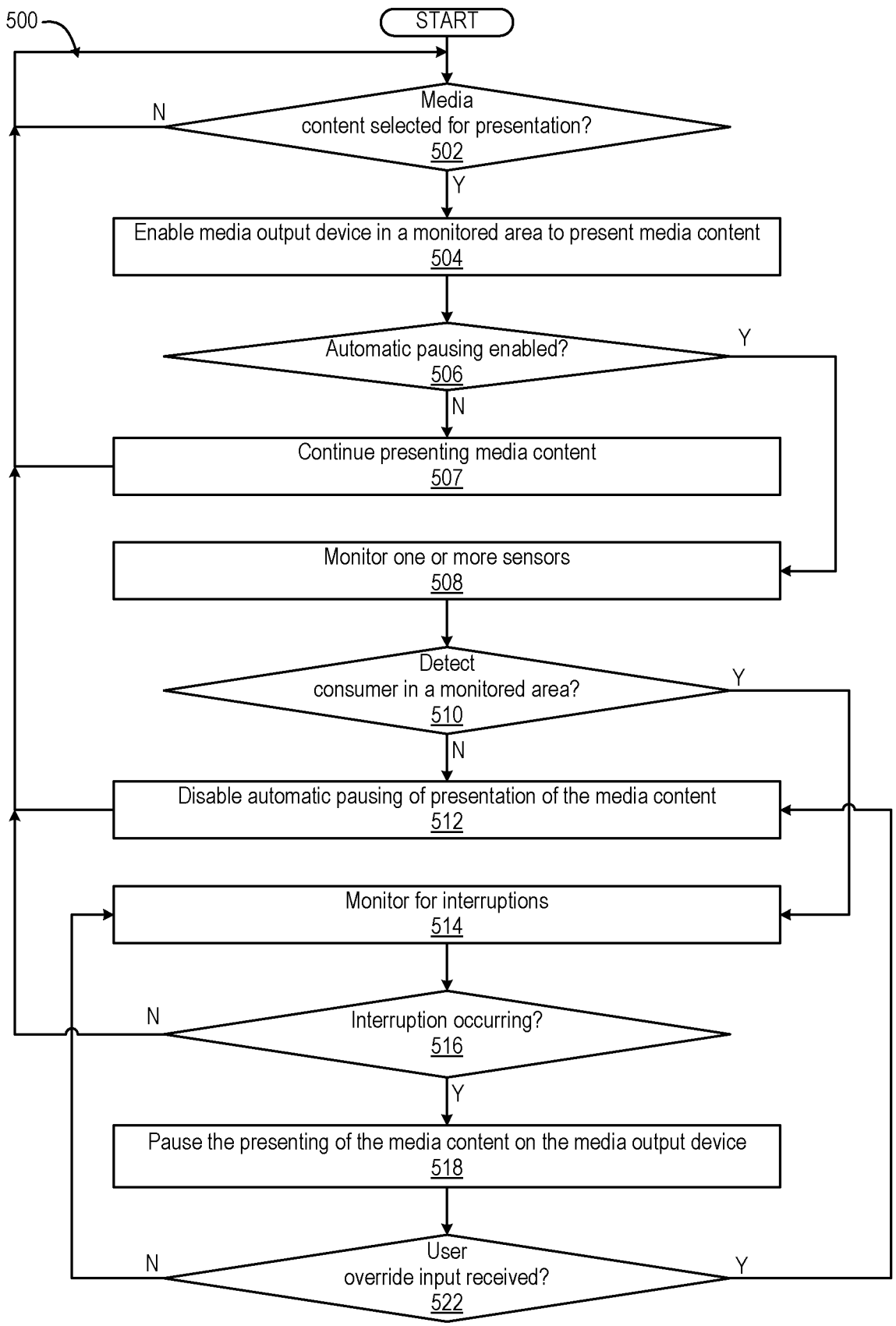
FIG. 5 presents a flow diagram of a method for pausing presentation of media content in response to detected interruptions, according to one or more embodiments.

FIG. 5 presents a flow diagram of method 500 for presenting and pausing presentation of media content in response to detected interruptions. In particular, method 500 manages control of media output device 143 via an electronic device such as communication device 100 (FIG. 1). In at least one embodiment, communication device 100, managed by controller 110, executes media streaming application 114 (FIG. 1) to manage presenting and pausing of media content in response to an interruption detected by image capturing device 130 or microphone 132 and identified by controller 110 (FIG. 1). The description of method 500, as well as methods 600 and 700 discussed respectively below with regard to FIGS. 6 and 7, are provided with general reference to the specific components illustrated within the preceding FIGS. 1-4, and specific components referenced in methods 500-700 can be identical or similar to components of the same name used in describing preceding FIGS. 1-4.

Method 500 includes determining, by an electronic device, whether media content is selected for presenting on a media output device (decision block 502). In response to determining that media content is not selected, method 500 returns to block 502. In response to determining that media content is selected, method 500 includes enabling, by a device interface of the electronic device, a media output device that is in a monitored area to present media content (block 504). In one or more embodiments, the media content includes video media content. In one or more embodiments, the electronic device streams the media content to the media output device. In one or more embodiments, the media content is read from local storage media or received by the media output device via a network connection. In one or more embodiments method 500 includes dimming a lighting system that illuminates the monitored area to a predefined level for media content presentation during presentation of the media content and brightening the lighting system when the presentation is paused. Method 500 includes determining whether automatic pausing in response to detected interruptions is enabled (decision block 506). In an example, a consumer of content can enable or disable automatic pausing in device or application settings. As described below, an initially enabled automatic pausing may be user overridden. If disabled or overridden, at some point during media presentation, consumer may enable automatic pausing again. In response to determining that automatic pausing in response to detected interruptions is not enabled (i.e., disabled), method 600 includes continuing to present media content (block 507). Then method 500 returns to block 506. In response to determining that automatic pausing in response to detected interruptions is enabled, method 500 includes monitoring for an interruption detected by one or more sensors from among: (i) an image capturing device positionable to have a field of view of a monitored area and (ii) a microphone positionable to detect sounds in or near the monitored area (block 508). Method 500 includes determining whether a consumer is detected in the monitored area (decision block 510). According to one aspect, particular kinds of detected interruptions are only relevant to the pausing of the media content if a consumer is present to experience the presenting of the media content and whose consumption of the content would be interrupted. In certain instances, the consumer may intend for the media content to be presented without pausing, such as to make people outside of house or apartment believe that an occupant is inside. If the consumer starts the presentation when the consumer is not in the monitored area, then the controller is programmed to determine that the consumer intends for the presentation to continue even when an interruption event is detected in the monitored area. With this embodiment, in response to determining that a consumer is not detected in the monitored area when presentation of the media content begins, method 500 includes disabling automatic pausing of presentation of the media content (block 512). Then method 500 returns to block 502.

In response to determining that a consumer is detected in the monitored area in decision block 510, in one or more embodiments method 500 includes monitoring the one or more sensors for an interruption that can degrade consumer experience relative to the presenting of the media content (block 514). In an example, sensors and controller can determine the presence of an interruption in response to sensors detecting an object being positioned between the media output device and the at least one consumer. In another example, controller can identify an interruption in response to sensors detecting that a consumer is not facing the media content player that is presenting video media content. In an additional example, controller can identify an interruption is occurring in response to sensors detecting that a consumer is leaving the monitored area. In this embodiment, the controller is programmed to determine that an interruption has occurred based on first detecting the consumer in the monitored area followed by detecting departure of the consumer from the monitored area while the content is being outputted. In a further example, controller can identify an interruption in response to the microphone detecting a specific sound or a decibel level of secondary sound that is associated with or pre-identified as an interruption. Method 500 includes determining whether an interruption is occurring (decision block 516). In one or more embodiments, a sound that indicates or is identified as a trigger to an interruption can occur briefly, but the interruption is determined to continue until the consumer responds to the sound and then returns or refocuses to continue consuming the content. In one or more embodiments, an interruption such as a person blocking a display screen has to continue to occur for more than a threshold minimum time (e.g., greater than 2 seconds) to be an interruption. In response to determining that no interruption is occurring, method 500 returns to block 514. In response to determining that the interruption is occurring (i.e., "Yes" in decision block 516), method 500 includes pausing the presenting of the media content on the media output device (block 518).

Method 500 includes determining whether a user override input (e.g., aural, visual, electronic, etc.) is received (decision block 522). In response to receiving a user override input, method 500 returns to block 512. A consumer may prefer that presentation of the media content continue even when interruptions occur. In an example, one person happens to be in the room but is not the primary consumer of the media content, such as a parent turning on programming for a young child. The parent may continue handling interruptions while wanting the child to be continually distracted with watching/consuming the programming. An override returns presentation to a default mode without automatic pausing when an interrupt event occurs. In response to not receiving a user override input, method 500 i returns to block 514.

Figure 6A:
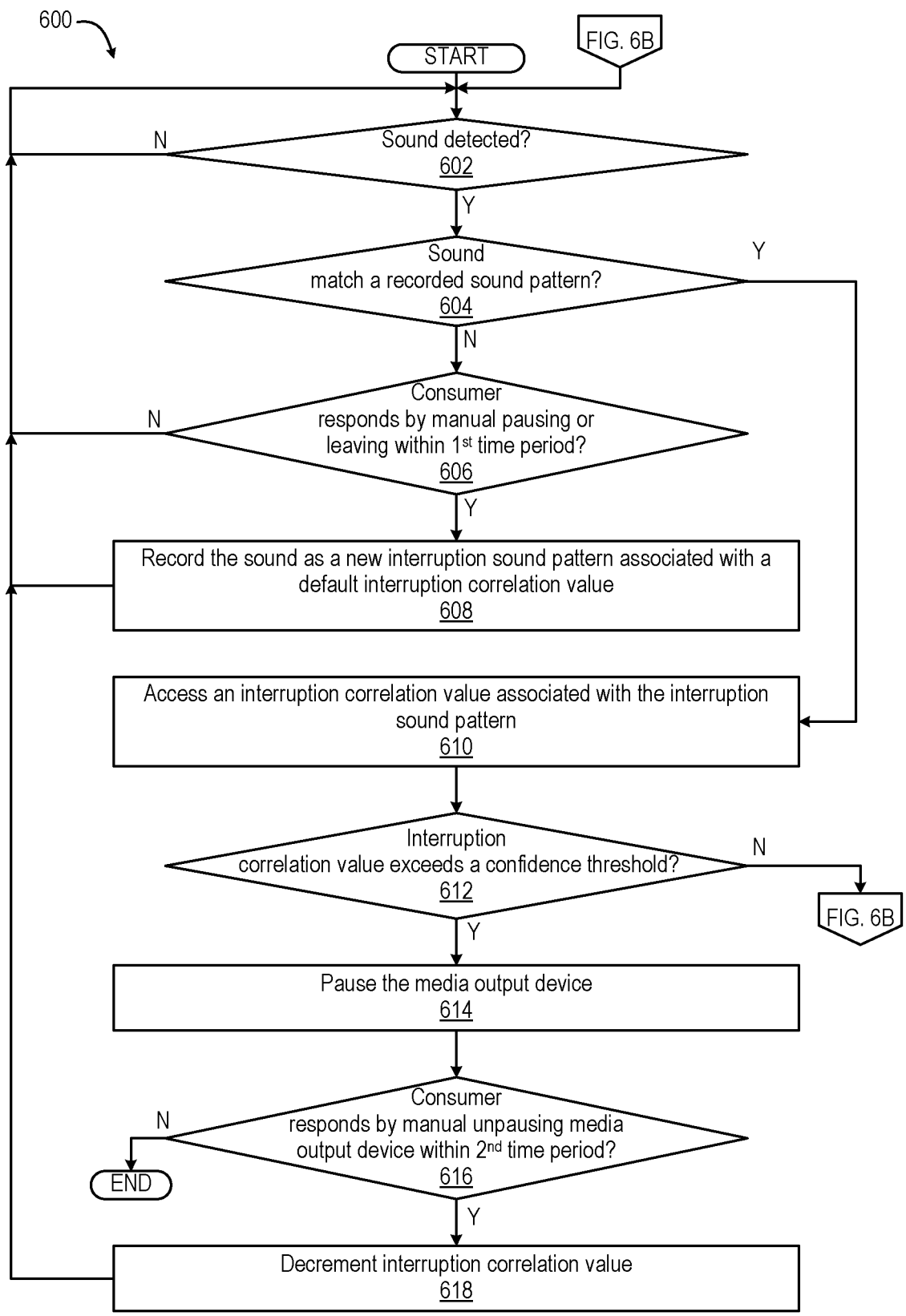
FIGS. 6A-6B (FIG. 6) present a flow diagram of a method for machine learning aural alarms that are interruption events requiring pausing of the output of media content, according to one or more embodiments.
Figure 6B:
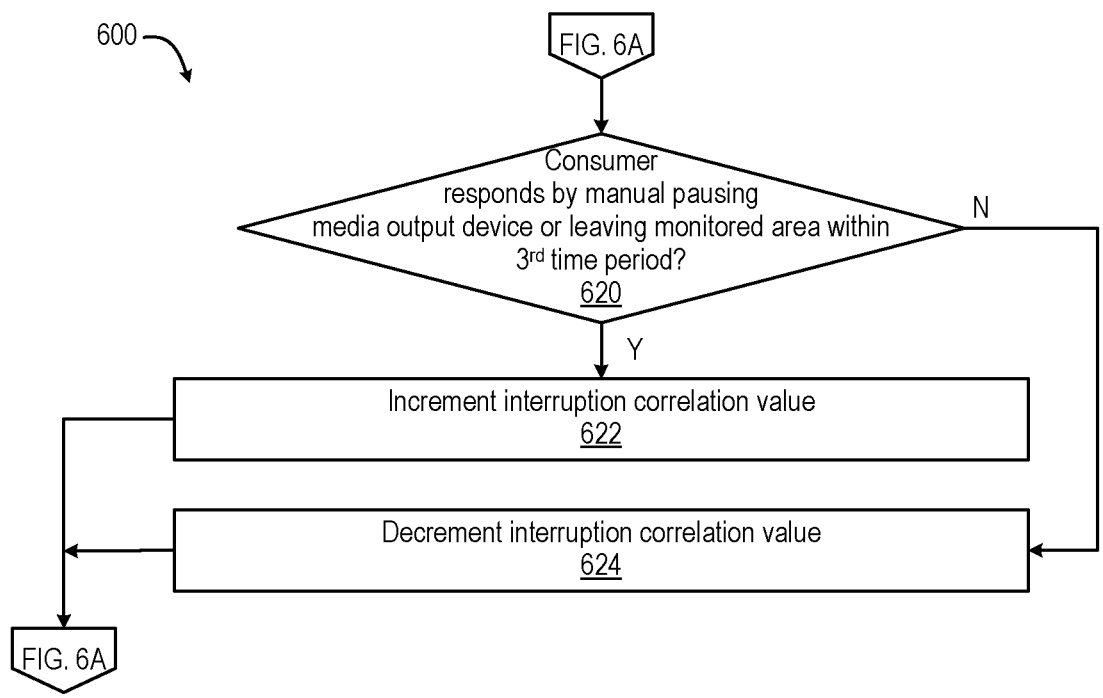
Figure 7:
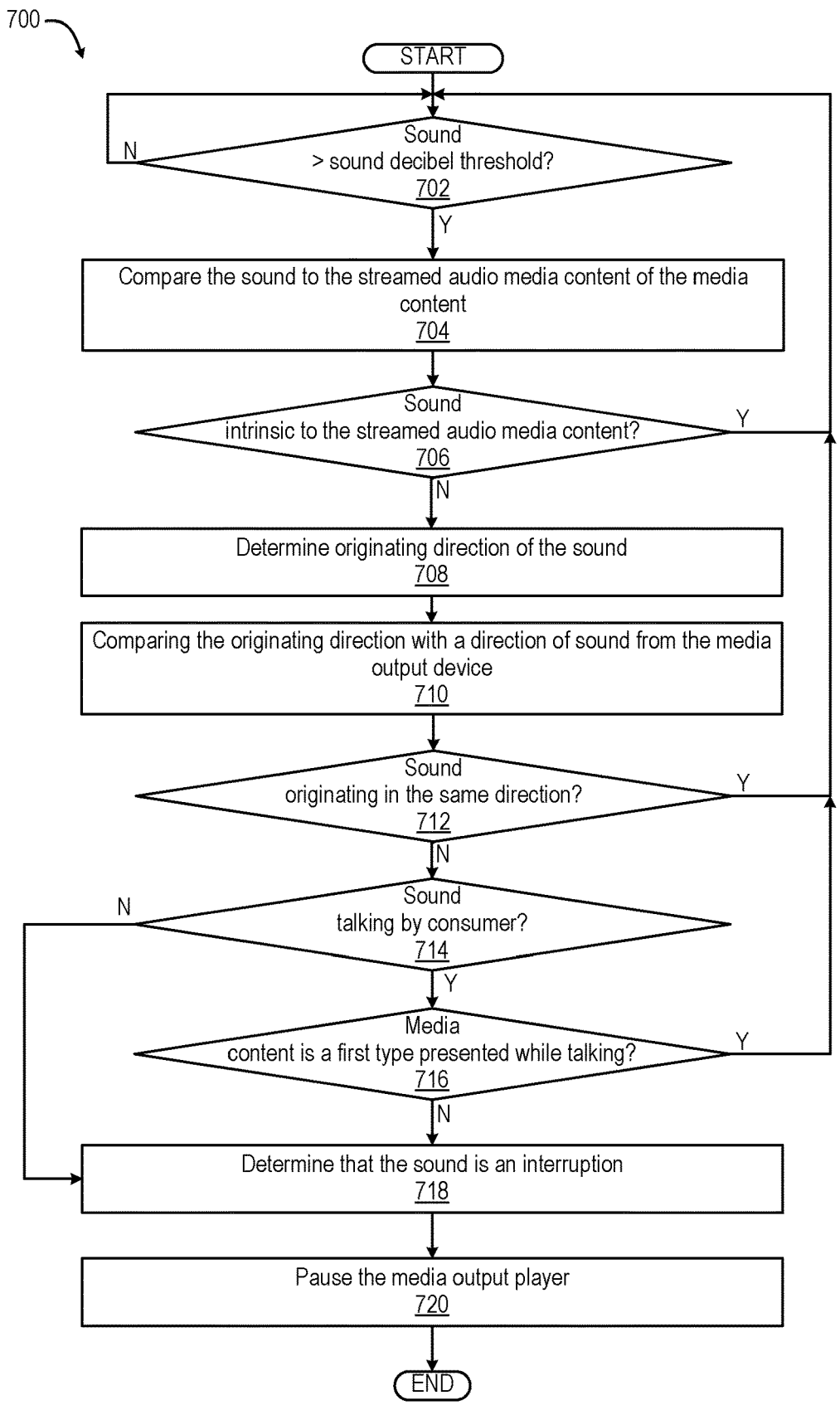
FIG. 7 presents a flow diagram of a method for pausing presentation of media content in response to aurally detected interruptions, according to one or more embodiments.

FIGS. 6A-6B (FIG. 6) present a flow diagram of method 600 for machine learning which aural sounds are to be identified as interruptions that should trigger pausing of presenting of media content. With reference to FIG. 6A, method 600 includes determining whether a sound is detected by the one or more sensors (block 602). In response to determining that a sound is not occurring, method 600 returns to block 602. In response to determining that a sound is occurring, method 606 includes determining whether the sound matches a recorded sound pattern that is to be considered an interruption (i.e., an "interruption sound pattern") (decision block 604). In one or more embodiments, assessing whether an interruption sound pattern is an urgent and important interruption event that warrants pausing presentation of media content is based on monitoring consumer response to both the sound and any automatic pausing of the presentation. In response to determining that the sound matches a recorded interruption sound pattern, method 600 proceeds to block 610. In response to determining that the sound does not match a recorded interruption sound pattern, method 600 includes determining whether the consumer responds to the sound that is new by either manually pausing a presentation of the media output device or leaving the monitored area within a first wait time period (decision block 606). In response to determining that the consumer responds to the sound that is new, method 600 includes recording the sound as a new interruption sound pattern associated with a default interruption correlation value (block 608). Then method 600 returns to block 602. In response to determining that the consumer does not respond to the sound, method 600 returns to block 602.

In response to determining that the sound matches a recorded interruption sound pattern, method 600 includes accessing an interruption correlation value associated with the interruption sound pattern (block 610). Method includes determining whether the interruption correlation value exceeds a confidence threshold associated with an urgent and important interruption event (decision block 612). In response to determining that the interruption correlation value does not exceed the confidence threshold (i.e., is equal to or less), method 600 proceeds to block 620. In response to determining that the interruption correlation value exceeds the confidence threshold, indicating an urgent and important interruption event, method 600 includes pausing the media output device (block 614). Method 600 includes determining whether the consumer responds to pausing the media content by manually unpausing the presentation of the media output device within a second wait time period (decision block 616). In response to determining that the consumer does not respond to pausing the media content by manually unpausing the presentation of the media output device within the second wait time period, then method 600 ends. Subsequent automatic unpausing of the media can occur as described in method 500 (FIG. 5). In response to determining that the consumer responds to pausing the media content by manually unpausing the presentation of the media output device within the second wait time period, then method 600 includes decrementing the interruption correlation value (block 618). Then method 600 returns to block 602.

In response to determining that the interruption correlation value does not exceed the confidence threshold (i.e., is equal to or less) in decision block 612, method 600 includes determining whether the consumer responds to the sound that is known but not automatically paused by either manually pausing a presentation of the media output device or leaving the monitored area within a third wait time period (decision block 620). In response to determining that the consumer responds to the sound that is known but not automatically paused, method 600 includes incrementing the interruption correlation value (block 622). Then method 600 returns to block 602. In response to determining that the consumer does not responds to the sound that is known but not automatically paused, method 600 includes decrementing the interruption correlation value (block 624). Then method 600 returns to block 602.

In one or more embodiments, a recorded sound pattern is unique but not necessarily very loud. For example, an appliance or a landline telephone can emit a sound in another room that is not loud enough to impair the user experience of consuming media content. However, the sound is sufficiently urgent and important that the consumer is compelled to go to the appliance. Other sounds, such as a dishwasher tone indicating completing the cleaning cycle, can be informational but not urgent and thus ignored. Method 600 includes learning from past consumer behavior what sounds are an interruption and what sounds do not trigger a response.

FIG. 7 presents a flow diagram of method 700 for pausing presentation of media content in response to aurally detected interruptions. Method 700 includes determining whether a sound is occurring that is greater than a sound decibel threshold (decision block 702). The sound decibel threshold can be dynamically determined based on baseline noise level. The sound decibel threshold can be user selected. In one or more embodiments, a sound decibel threshold is set for an absolute sound level that in most instances would prevent a consumer from hearing an audio portion of media content and would be too distracting to continue viewing a visual portion of media content. In response to determining that a sound is not occurring that is greater than the sound decibel threshold, method 700 returns to block 702. In response to determining that a sound is occurring that is greater than the sound decibel threshold, in one or more embodiments, method 700 includes comparing the sound to the streamed audio media content of the media content (block 704). In one embodiment, the electronic device has access to an electronic version of the media content to compare to an audio input to a microphone. In one or more embodiments, method 700 includes determining whether the sound is intrinsic to the streamed audio media content (decision block 706). In response to determining that the sound is intrinsic, method 700 includes returning to block 702.

In one or more embodiments, the electronic device may not have access to the audio media content to make the comparison. In one or more embodiments, method 700 includes determining an originating direction of the sound detected in the monitored area (block 708). Method 700 includes comparing the originating direction of the sound with a direction of the sound from media output device (block 710). Method 700 includes determining whether the sound is originating in the same direction as the sound from the media output device (decision block 712). In response to determining that the sound is originating in the same direction, method 700 returns to block 702.

In one or more embodiments, the electronic device 100 may not be able to differentiate the originating location of the sound. In an example, the microphones 132 (FIG. 1) are not adequate to determine the direction. In another example, the acoustics of the monitored space may not be conducive to distinguishing the directions of sources of sound. In an additional example, two sources of sound can be closely positioned.

In response to determining that the sound does not originate in the same direction as the media output device and is thus extrinsic, method 700 includes determining whether the sound is a consumer talking (decision block 714). In response to determining that the sound is a consumer talking, method 700 includes determining whether the media content is a first type that is intended to be presented while a consumer is talking (decision block 716). In an example, consumers of a live sporting event can enjoy outbursts without wanting to pause presenting of the game. In another example, particular movies such as "The Rocky Horror Picture Show" may illicit audience participation as part of the user experience. An exercise program may prompt the viewers to stand in front of the media output device. These types of media content can be treated differently from other types of media content in which noise outbursts and blocking of the screen are deemed to be interruptions. In response to determining that the media content is the first type, method 700 returns to block 702. In response to determining that the media content is not the first type, method 700 includes determining that the sound is an interruption (block 718). Method 700 includes pausing the media output player (block 720). Then method 700 ends.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a device interface that is communicatively coupled to a media output device that presents media content in a monitored area;
one or more sensors from among: (i) an image capturing device positionable to have a field of view of the monitored area and (ii) a microphone positionable to detect sounds in or near the monitored area, the one or more sensors detecting one or more of an object or a sound that interrupts a consumer in the monitored area from experiencing the presenting of the media content, while the electronic device is positioned in or proximate to the monitored area;
a controller communicatively coupled to the device interface and the one or more sensors, and which:
determines, using the one or more sensors, that the consumer is in the monitored area during the presenting of the media content;
monitors the one or more sensors to determine whether an interruption is occurring that can degrade consumer experience relative to the presenting of the media content wherein the interruption comprises at least an audible interruption, and the controller: compares each extrinsic sound detected by the one or more sensors to sounds corresponding to the one or more sound patterns stored in memory; and determines that the interruption is occurring in response to finding a match between an extrinsic sound detected by the one or more sensors and a sound corresponding to one of the one or more sound patterns stored in memory; and
in response to determining that the interruption is occurring, pauses the presenting of the media content at the media output device.

2. The electronic device of claim 1, wherein the controller:
determines, using the at least one image capturing device, whether the consumer is facing the media content player to experience the presenting of video media content; and
determines that the interruption is occurring based on the consumer not facing the media content player.

3. The electronic device of claim 1, wherein the controller:
monitors, using the at least one image capturing device, for a presence of the consumer in the monitored area while the media content is being presented; and
determines that the interruption is occurring in response to detecting the consumer leaving the monitored area.

4. The electronic device of claim 1, wherein the controller:
determines, using the at least one image capturing device, that the at least one person is in the monitored area during the presenting of the media content;
monitors, via the at least one image capturing device, for an object being positioned between the media output device and the at least one person; and
determining based on the presence of the object that the interruption is occurring;
in response to determining that the interruption is occurring, pauses presenting of video media content by the media output device using the device interface.

5. The electronic device of claim 1, wherein the controller:
determines an originating direction of sounds detected by the one or more sensors;
determines a first location of the media output device that is presenting audio media content; and
determines that the interruption is occurring based on detecting a sound that is: (i) louder than a sound decibel threshold; and (ii) at a second location that is different from the first location.

6. The electronic device of claim 1, wherein the controller:
streams the media content comprising audio media content to the media output device; and
compares the audio media content to sounds detected by the one or more sensors; and
determines that the interruption is occurring based on the sounds comprising extrinsic sounds that are not associated intrinsically with the media content being streamed.

7. The electronic device of claim 6, further comprising a memory containing the one or more sound patterns and communicatively coupled to the controller, wherein the controller:
in response to detecting a unique extrinsic sound, determines whether a consumer responds within a time threshold by one or more of: (i) manually pausing the media output device; and (ii) leaving the monitored area, indicating that the unique extrinsic sound is an alarm; and
in response to the consumer indicating that the unique extrinsic sound is an alarm, records the unique extrinsic sound as a sound pattern.

8. The electronic device of claim 1, wherein the controller:
identifies each media content as one of: (i) a first type that is intended to present while a consumer is talking; and (ii) a second type that is not intended to present while a consumer or non-consumer is talking; and
determines that the interruption is occurring based on detecting talking concurrent with the presenting of the second type of the media content.

9. The electronic device of claim 1, wherein, subsequent to pausing the media output device, the controller:
monitors the one or more sensors to determine whether the interruption has ceased occurring; and
in response to determining that the interruption has ceased occurring, resumes presenting the media content via the media output device using the device interface.

10. The electronic device of claim 1, wherein:
the device interface comprises an interface that is communicatively coupled to a lighting system that illuminates the monitored area; and
the controller:
dims the lighting system using the device interface in response to the media output device playing the media content; and
brightens the lighting system using the device interface in response to pausing the presentation of the media content on the media output device.

11. A method comprising:
determining, using one or more sensors from among: (i) an image capturing device positionable to have a field of view of a monitored area and (ii) a microphone positionable to detect sounds in or near the monitored area, that a consumer is in the monitored area during presenting of media content by a media output device;

monitoring the one or more sensors to determine whether an interruption is occurring that can degrade consumer experience relative to the presenting of the media content, wherein the interruption comprises at least an audible interruption, and the method includes: comparing each extrinsic sound detected by the one or more sensors to sounds corresponding to the one or more sound patterns stored in memory; and determining that the interruption is occurring in response to finding a match between an extrinsic sound detected by the one or more sensors and a sound corresponding to one of the one or more sound patterns stored in memory; and in response to determining that the interruption is occurring, pausing the presenting of the media content on the media output device.

12. The method of claim 11, wherein monitoring the one or more sensors to determine whether the interruption is occurring comprises one or more of:

determining that a consumer is not facing the media content player that is presenting video media content; and determining that a consumer leaving the monitored area.

13. The method of claim 11, wherein determining that the interruption is occurring comprises:

determining, using the at least one image capturing device, that the at least one person is in the monitored area during the presenting of the media content;

monitoring, via the at least one image capturing device, for an object being positioned between the media output device and the at least one person; and determining based on the presence of the object that the interruption is occurring.

14. The method of claim 11, further comprising:

determining whether sounds are extrinsic from the media content by one of: (i) determining that an originating direction of the sounds detected by the one or more sensors is different from a direction of the media output device that is presenting the audio media content; and (ii) comparing the media content that is being streamed by the electronic device to the media output device to the sounds detected by the one or more sensors; and determining that the interruption is occurring based on detecting that an extrinsic sound is louder than a sound decibel threshold.

15. The method of claim 14, further comprising:

in response to detecting a unique extrinsic sound, determines whether a consumer responds within a time threshold by one or more of: (i) manually pausing the media output device; and (ii) leaving the monitored area, indicating that the unique extrinsic sound is an alarm; and in response to the consumer indicating that the unique extrinsic sound is an alarm, records the unique extrinsic sound as a sound pattern.

16. The method of claim 11, further comprising:

identifying each media content as one of: (i) a first type that is intended to present while a consumer is talking; and (ii) a second type that is not intended to present while a consumer or non-consumer is talking; and determining that the interruption is occurring by detecting talking concurrent with the presenting of the second type of the media content.

17. The method of claim 11, further comprising:

subsequent to pausing the media output device:

monitoring the one or more sensors to determine whether the interruption has ceased occurring; and in response to determining that the interruption has ceased occurring, resuming presenting the media content via the media output device using the device interface.

18. The method of claim 11, wherein:

dimming a lighting system that illuminates the monitored area in response to the media output device playing the media content; and brightening the lighting system in response to pausing the presentation of the media content on the media output device.

19. A computer program product comprising:

a computer readable storage device; and program code on the computer readable storage device that when executed by a processor associated with an electronic device, the program code enables the electronic device to provide functionality of:

determining, using one or more sensors from among: (i) an image capturing device positionable to have a field of view of a monitored area and (ii) a microphone positionable to detect sounds in or near the monitored area, that a consumer is in the monitored area during presenting of media content by a media output device;

monitoring the one or more sensors to determine whether an interruption is occurring that can degrade consumer experience relative to the presenting of the media content, wherein the interruption comprises at least an audible interruption, and the electronic device performs the functionality of: comparing each extrinsic sound detected by the one or more sensors to sounds corresponding to the one or more sound patterns stored in memory; and determining that the interruption is occurring in response to finding a match between an extrinsic sound detected by the one or more sensors and a sound corresponding to one of the one or more sound patterns stored in memory; and in response to determining that the interruption is occurring, pausing the presenting of the media content on the media output device.

20. The computer program product of claim 19, wherein the program code enables the electronic device to provide the functionality of monitoring the one or more sensors to determine whether the interruption is occurring comprises one or more of:

determining that a consumer is not facing the media content player that is presenting video media content; and determining that a consumer leaving the monitored area.

* * * * *